United States Patent [19]
Cube

[11] Patent Number: 5,884,429
[45] Date of Patent: Mar. 23, 1999

[54] FISHING ROD STRIKE INDICATOR FOR INCREASING REACTION TIME WITH THE FISHING REEL IN GEAR

[76] Inventor: Ian V. Cube, 10453 Artesia Blvd., Apt. 63B, Bellflower, Calif. 90706

[21] Appl. No.: 833,139

[22] Filed: Apr. 4, 1997

Related U.S. Application Data

[63] Continuation-in-part of Ser. No. 642,934, May 6, 1996, Pat. No. 5,678,347.

[51] Int. Cl.⁶ .......................... A01K 93/02; A01K 97/12
[52] U.S. Cl. ................................................................. 43/17
[58] Field of Search ............................................. 43/17, 25

[56] References Cited

U.S. PATENT DOCUMENTS

| | | | |
|---|---|---|---|
| 2,650,447 | 9/1953 | Johnson | 43/24 |
| 4,125,957 | 11/1978 | Cunningham | 43/17 |
| 4,702,031 | 10/1987 | Sousa | 43/24 X |
| 4,730,409 | 3/1988 | Mitchell et al. | 43/25 |
| 4,939,864 | 7/1990 | Bowles | 43/25 X |
| 5,172,509 | 12/1992 | Motovik | 43/25 X |
| 5,678,347 | 10/1997 | Cube | 43/17.24 |

Primary Examiner—Joseph J. Hall, III
Assistant Examiner—Anthony Ojini

[57] ABSTRACT

A fishing rod strike indicator for increasing reaction time with the fishing reel in gear for use with a fishing rod including at least one rod guide and fishing line, a rod station being formed in a rectangular configuration with an outer surface, an inner surface, two apertures and two VELCRO bands each coupled through one of the apertures, the inner surface of the rod station being positioned upon a fishing rod adjacent a rod guide, the VELCRO bands of the rod station being wrapped around the fishing rod then through the rod station and folded back and coupled to itself to secure the rod station to the rod; and at least one generally elliptical ring having a folded region and an inner surface including VELCRO loop strips coupled to the folded region, the VELCRO loop strips of the folded region of a ring being couplable to the VELCRO bands of the rod station, one ring being coupled to the apparatus during use, in an operative orientation a ring being pulled downward with a quarter turn whereby the elliptic ends of the ring engage a fishing line thereby extending the line away from the fishing rod and rod guide, the extended line enhancing a user's ability to detect bites from fish.

8 Claims, 5 Drawing Sheets

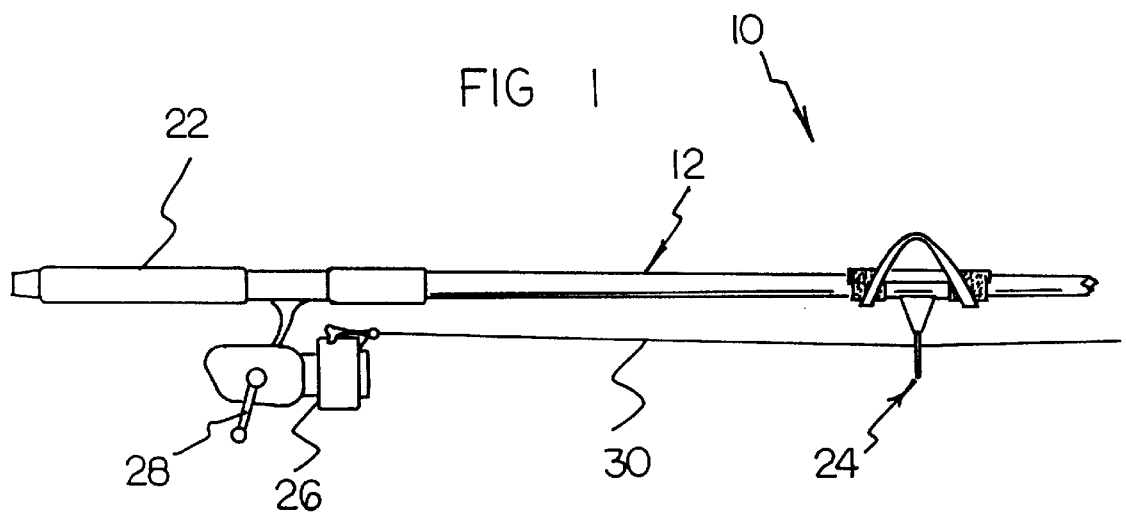
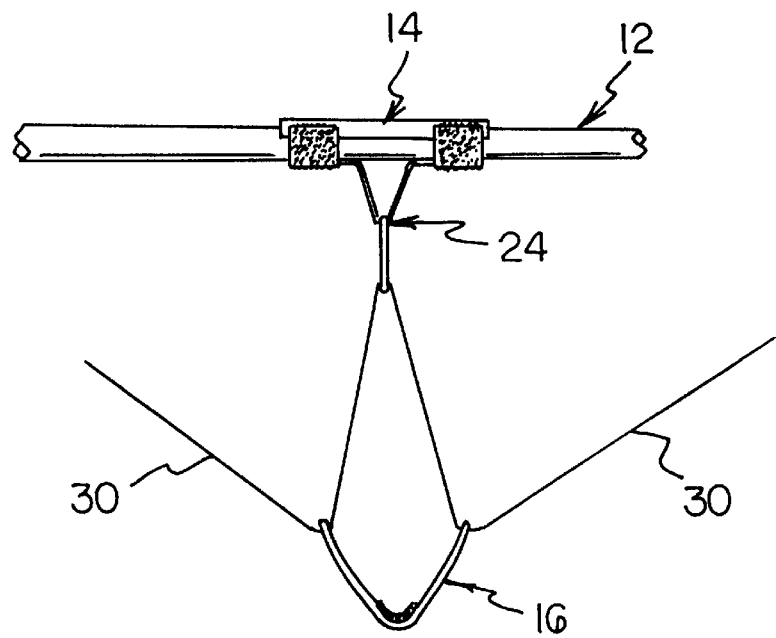

FISHING ROD STRIKE INDICATOR FOR INCREASING REACTION TIME WITH THE FISHING REEL IN GEAR

The present application is a continuation-in-part application of application Ser. No. 08/642,934 filed May 6, 1996, now U.S. Pat. No. 5,678,347 patented Oct. 21, 1997.

BACKGROUND OF THE INVENTION

1. Field of the Invention

The present invention relates to a fishing rod strike indicator for increasing reaction time with the fishing reel in gear and more particularly pertains to adjusting a fishing rod line to enhance a user's ability to detect bites especially when the line is engaged by the fishing reel.

2. Description of the Prior Art

The use of fishing accessories is known in the prior art. More specifically, fishing accessories heretofore devised and utilized for the purpose of accesorizing conventional fishing gear are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,077,928 to Deskevich discloses a fishing line rod bobber.

U.S. Pat. No. 4,702,031 to Sousa discloses a bite indicator for fishing gear.

U.S. Pat. No. 4,552,318 to Durham discloses a fish strike indicator.

U.S. Pat. No. 4,939,864 to Bowles discloses a visual fishing aid.

U.S. Pat. No. 4,125,957 to Cunningham discloses a fishing rod holder and indicator assembly.

U.S. Pat. No. Des. 326,136 to Hochstetler discloses an ice fishing line movement indicator.

While these devices fulfill their respective, particular objective and requirements, the aforementioned patents do not describe a fishing rod strike indicator for increasing reaction time with the fishing reel in gear for adjusting a fishing rod line to enhance a user's ability to detect bites while the line is engaged by the fishing reel.

In this respect, the fishing rod strike indicator for increasing reaction time with the fishing reel in gear according to the present invention substantially departs from the conventional concepts and designs of the prior art, and in doing so provides an apparatus primarily developed for the purpose of adjusting a fishing rod line to enhance a user's ability to detect bites while the line is engaged by the fishing reel.

Therefore, it can be appreciated that there exists a continuing need for new and improved fishing rod strike indicator for increasing reaction time with the fishing reel in gear which can be used for adjusting a fishing rod line to enhance a user's ability to detect bites while the line is engaged by the fishing reel. In this regard, the present invention substantially fulfills this need.

SUMMARY OF THE INVENTION

In the view of the foregoing disadvantages inherent in the known types of fishing accessories now present in the prior art, the present invention provides an improved fishing rod strike indicator for increasing reaction time while the line is engaged by the fishing reel. As such, the general purpose of the present invention, which will be described subsequently in greater detail, is to provide a new and improved fishing rod strike indicator for increasing reaction time with the fishing reel in gear and method which has most of the advantages of the prior art and none of the disadvantages.

To attain this, the present invention essentially comprises a new and improved fishing rod strike indicator for increasing reaction time with the fishing reel in gear comprising, in combination: a combination fishing rod and reel, the rod being formed in an elongated generally cylindrical configuration with an inboard end including a handle, the fishing rod including at least one generally circular rod guide, the reel being attached to the fishing rod adjacent the handle, the reel including winding means, fishing line being wound within the reel and positioned through the rod guides; a rod station being fabricated of rigid plastic and formed in a generally rectangular configuration with a convex outer surface, a concave inner surface and two rectangular shaped apertures, the rod station having an inboard end including two projecting members, the rod station further including two VELCRO bands each coupled through one of the rectangular shaped apertures, each VELCRO band having an outer surface and an inner surface including VELCRO hooks, the outer surface of each VELCRO band further including a lower region with VELCRO loops, in an operative orientation the inner surface of the rod station being positioned upon the fishing rod adjacent the rod guide, the VELCRO bands of the rod station being wrapped around the fishing rod then through the rod station and folded back and coupled to itself to secure the rod station to the rod; and a large ring, a medium ring and a small ring, each ring being fabricated of smooth rigid plastic, each ring being shaped in a generally elliptical configuration and folded along its center point to form a generally V-shaped configuration, each ring having a folded region, each ring having an inner surface including VELCRO loop strips coupled to the folded region, in an inoperative orientation the VELCRO loop strips of the folded region of a ring being coupled to the bands of the rod station, only one of the rings being coupled to the apparatus during use, in an operative orientation a ring being pulled downward with a quarter turn by the user whereby the elliptic ends of the ring engage the fishing line thereby extending the line away from the fishing rod and rod guide, the extended line enhancing a user's ability to detect bites from fish.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod strike indicator for increasing reaction time with the fishing reel in gear which has almost all the advantages of the prior art fishing accessories and none of the disadvantages.

It is another object of the present invention to provide a new and improved fishing rod strike indicator for increasing reaction time with the fishing reel in gear which may be easily and efficiently manufactured and marketed.

It is a further object of the present invention to provide a new and improved fishing rod strike indicator for increasing reaction time with the fishing reel in gear which is of durable and reliable construction.

An even further object of the present invention is to provide a new and improved fishing rod strike indicator for increasing reaction time with the fishing reel in gear which is susceptible of a low cost of manufacture with regard to both materials and labor, and which accordingly is then susceptible of low prices of sale to the consuming public, thereby making such a fishing rod strike indicator for increasing reaction time with the fishing reel in gear economically available to the buying public.

Still yet another object of the present invention is to provide a new and improved fishing rod strike indicator for increasing reaction time with the fishing reel in gear which provides in the apparatuses and methods of the prior art most of the advantages thereof, while simultaneously overcoming most of the disadvantages normally associated therewith.

Even still another object of the present invention is to provide a new and improved fishing rod strike indicator for increasing reaction time with the fishing reel in gear for adjusting a fishing rod line to enhance a user's ability to detect bites.

Lastly, it is an object of the present invention to provide a new and improved fishing rod strike indicator for increasing reaction time with the fishing reel in gear for use in association with a fishing rod including at least one rod guide, a fishing reel and fishing line, the apparatus comprises a rod station formed in a rectangular configuration with an outer surface, an inner surface and two apertures, the rod station further including two VELCRO bands each coupled through one of the apertures, in an operative orientation the inner surface of the rod station being positioned upon a fishing rod adjacent a rod guide, the VELCRO bands of the rod station being wrapped around the fishing rod then through the rod station and folded back and coupled to itself to secure the rod station to the rod; and at least one generally elliptical ring having a folded region and an inner surface including VELCRO loop strips coupled to the folded region, in an inoperative orientation the VELCRO loop strips of the folded region of a ring being coupled to the VELCRO bands of the rod station, one ring being coupled to the apparatus during use, in an operative orientation a ring being pulled downward with a quarter turn by the user whereby the elliptic ends of the ring engage a fishing line thereby extending the line away from the fishing rod and rod guide, the extended line enhancing a user's ability to detect bites from fish.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the fishing rod strike indicator for increasing reaction time with the fishing reel in gear constructed in accordance with the principles of the present invention.

FIG. 2 is an isolated perspective view illustrating the fishing line in an extended orientation.

The same reference numerals refer to the same parts through the various Figures.

DESCRIPTION OF THE PREFERRED EMBODIMENT

Figure 3:
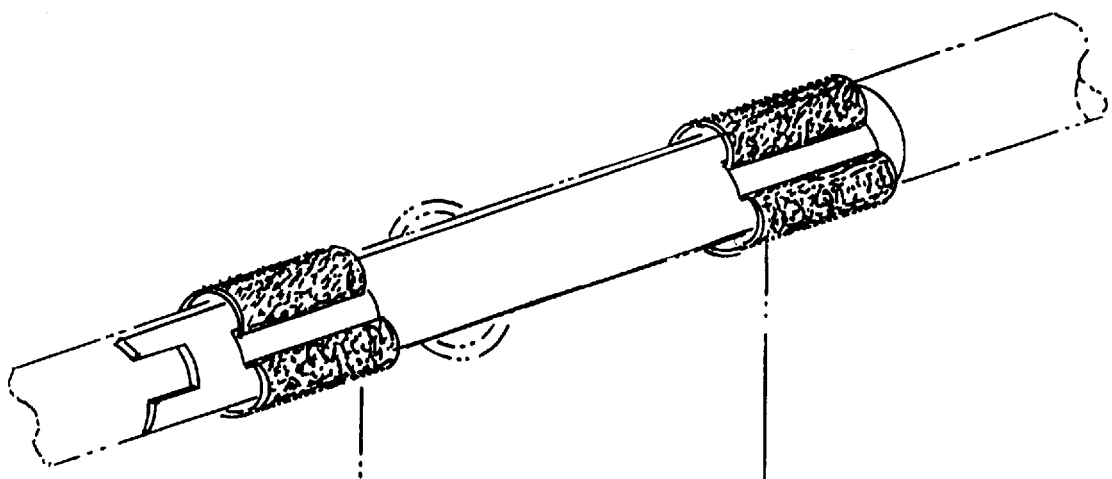
FIG. 3 is an enlarged perspective view of the rod station of the apparatus.

With reference now to the drawings, and in particular, to FIG. 1 thereof, the preferred embodiment of the new and improved fishing rod strike indicator for increasing reaction time with the fishing reel in gear embodying the principles and concepts of the present invention and generally designated by the reference number 10 will be described.

Specifically, it will be noted in the various Figures that the device relates to a fishing rod strike indicator for increasing reaction time with the fishing reel in gear 10 for adjusting a fishing rod line to enhance a user's ability to detect bites.

In its broadest context, the device consists of a fishing rod 12, a rod station 14, and three rings 16, 18, 20. Such components are individually configured and correlated with respect to each other so as to attain the desired objective.

A combination fishing rod and reel is included with the apparatus. The rod 12 is formed in an elongated generally cylindrical configuration with an inboard end which includes a handle 22. The fishing rod includes at least one generally circular rod guide 24. In the preferred embodiment a double footed rod guide is included. The reel 26 is attached to the fishing rod adjacent the handle. The reel includes winding means. In the preferred embodiment, the winding means is a manual handle 28. Fishing line 30 is wound within the reel and positioned through the rod guides. In alternate embodiments a fishing rod is not included with the apparatus. Rather the rod station and rings are adapted to be coupled to an existing fishing rod. Note FIG. 1.

Figure 6:
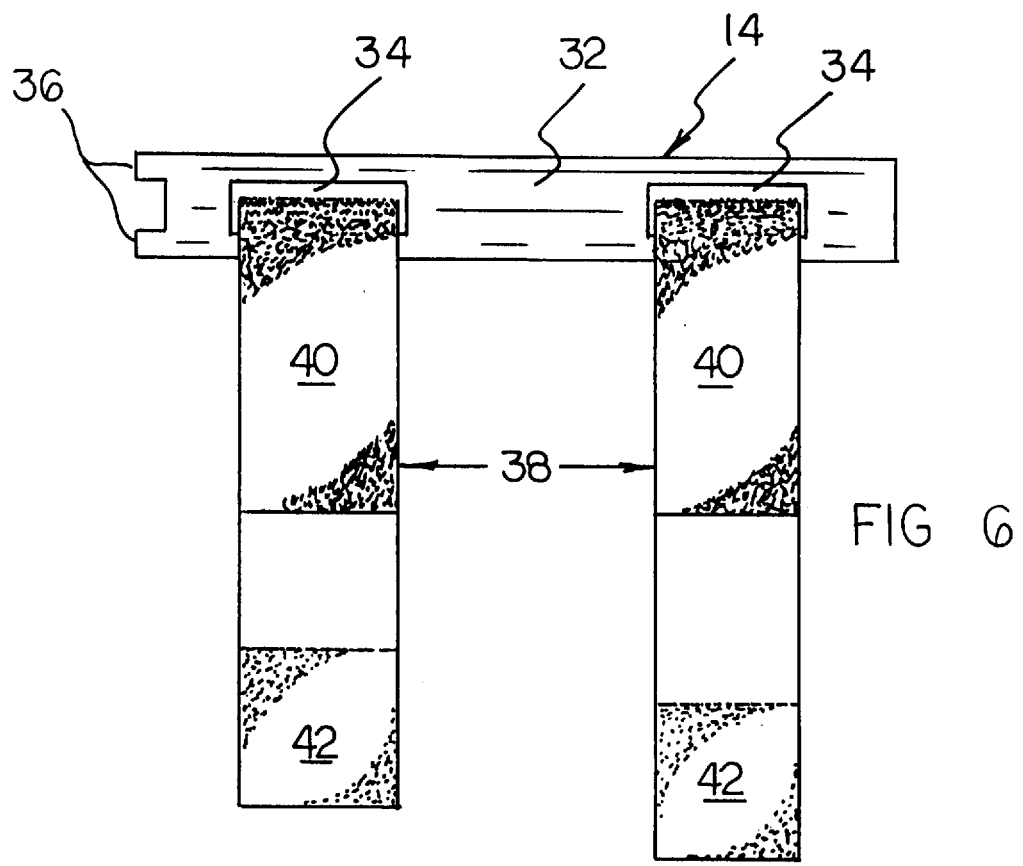
FIG. 6 is an isolated perspective view of the rod station illustrating the VELCRO bands of the apparatus.
Figure 7:
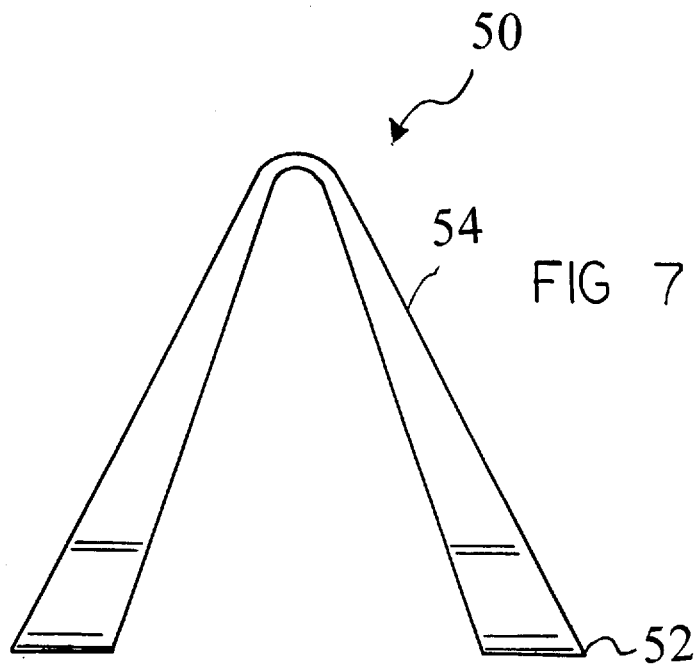
FIG. 7 is a side view of an alternate embodiment of the present invention.

The rod station 14 is fabricated of rigid plastic. The rod station is formed in a generally rectangular configuration with a convex outer surface 32, a concave inner surface and two rectangular shaped apertures 34. The rod station has an outboard end which includes two projecting members 36. The rod station further includes two VELCRO bands 38. Each of the bands is coupled through one of the rectangular shaped apertures. Each VELCRO band has an outer surface and an inner surface, both including VELCRO hooks 40. The outer surface of each VELCRO band further includes a lower region with VELCRO loops 42. In an operative orientation the inner surface of the rod station is positioned upon the fishing rod 12 adjacent the rod guide 24. The lower region of the VELCRO bands are wrapped around the fishing rod, threaded through their rod station apertures on the other side, then folded back and coupled to its outer surface. This functions to secure the rod station to the rod. Note FIGS. 2, 3 and 6.

Figure 4:
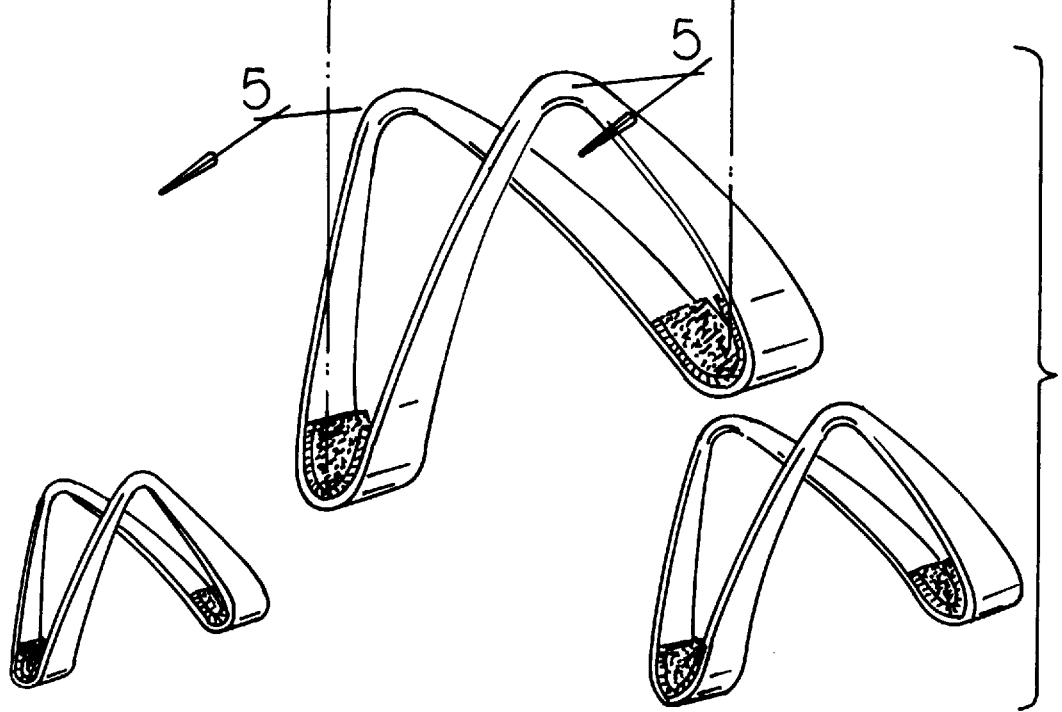
FIG. 4 is an isolated perspective view of the large, medium and small rings of the apparatus.
Figure 5:
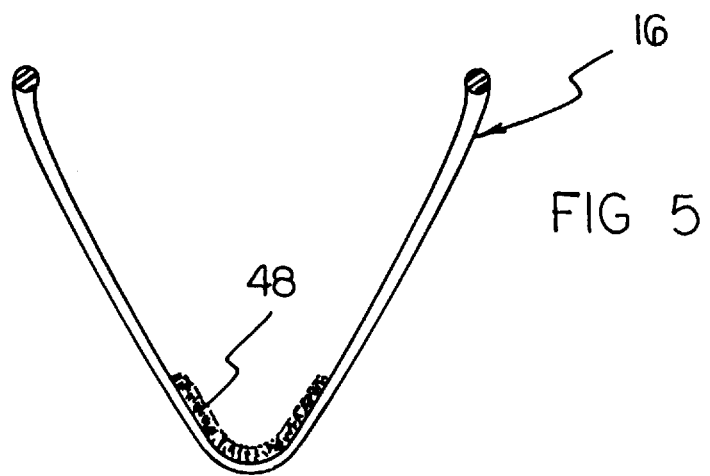
FIG. 5 a cross-sectional view of the large ring of the apparatus taken along section line 5—5 of FIG. 4.

A large ring 16, a medium ring 18 and a small ring 20 are each included with the apparatus. Each ring is fabricated of smooth rigid plastic. Each ring is shaped in a generally elliptical configuration and folded along its center point to form a generally V-shaped configuration. Each ring has a folded region 44. Each ring has an inner surface 46 which includes VELCRO loop strips 48 which are coupled to the folded region. Note FIGS. 2, 4 and 5.

In an inoperative orientation the VELCRO loop strips 48 of the folded region of a ring are coupled to the VELCRO bands 38 of the rod station. Only one of the rings is coupled to the apparatus during use. A user may choose the small ring, the medium ring or the large ring depending on the bait he uses and the fish he is trying to catch. In an operative orientation the ring is pulled downward with a quarter turn by the user. This action causes the two elliptic ends of the ring to engage the fishing line 30 at two spaced locations, thereby extending the line away from the fishing rod 12 and rod guide 24 in a stable manner. The extended line enhances a user's ability to detect bites from fish. Note FIGS. 1 and 2.

Figure 8:
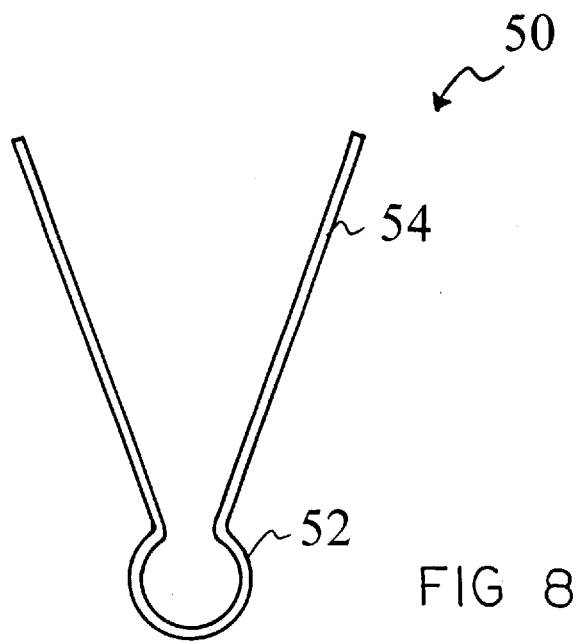
FIG. 8 is a front view of the alternate embodiment of the present invention.
Figure 9:
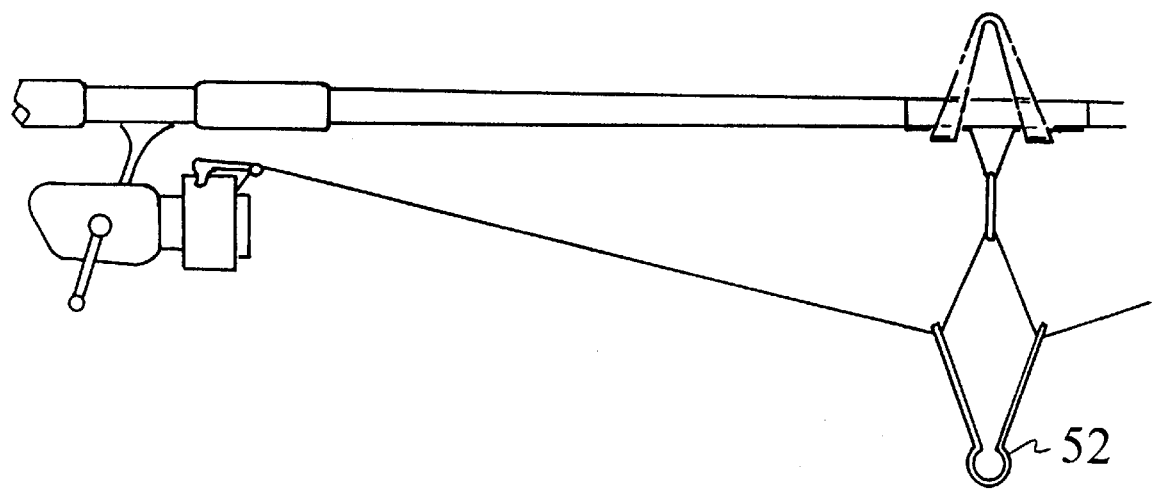
FIG. 9 is a side and front view of the alternate embodiment of the present invention both in its operative and inoperative orientation.
Figure 10:
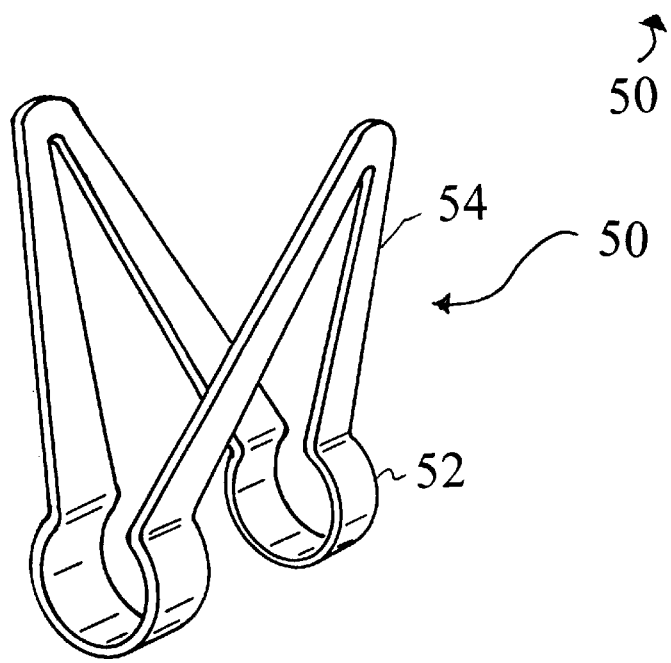
FIG. 10 is a perspective view of the alternate embodiment of the present invention.

An alternate embodiment 50 of the present invention is shown in FIGS. 7–10. In such embodiment, VELCRO is replaced with an alternate coupling means. Consequently, a rod station is no longer needed. As shown in FIGS. 8 & 10, the centerpoint of the rings are each molded to have a generally U-shaped configuration. More specifically, each area of the ring which is folded forms an annular portion 52 which defines approximately 80% of a full circle with a space between ends of the circle. The remaining portions of the elliptical ring are integrally coupled to these ends and extended outwardly in a linear fashion to define a pair of legs 54. Such legs together with the centerpoint define a 40 degree angle. In the present embodiment, it is imperative that the ring be constructed from a resilient material. By this design, the annular portions of each ring may be snappedly attached to the rod in a stored orientation. In such orientation, the legs of the ring extend above the rod on a side opposite the fishing line associated with the rod. When use of the device is desired, a predetermined downwardly applied force may be imparted on the legs thereby releasing the annular portions from the rod. At this point, the device may be maneuvered and used in a manner similar to the previous embodiment. When utilized, the present invention defines a hanging means abutting the line of the rod at two spaced locations for providing stability during use of the rod. It should be understood that the amount of force required to remove the device is a function of the type of material used to construct the device and further the percentage of a full circle the annular portions defines. Preferably, the rings of the present embodiment have a height of approximately 2–3 inches and have weights of $\frac{1}{16}$, $\frac{1}{8}$, and $\frac{1}{4}$ of an ounce. The selection of height is critical in preventing the device from inverting and tangling line as a result of the line shaking as is common during use.

Additional information regarding the preferred embodiment of the fishing rod strike indicator for increasing reaction time with the fishing reel in gear is summarized below:
Attaching the rod station There are 2 ways to attach the rod station depending on which rod type is used and which size ring is used.

Spinning rods can be classified into 2 types:
1) rods with single-footed rod guides
2) rods with double-footed rod guides (these are the big saltwater types and the old-fashioned made in the 60's & 70's types)

The small ring can only be used in a modified configuration of the rod station. In this configuration, the rod station body is on the bottom of the rod. With other single-footed rod guides the heavier rings are used. In this configuration, the rod station body is on the top of the rod.

DISCUSSION ABOUT THE RING

There are 3 different weights in 2 different ring sizes.

| small = $\frac{1}{16}$ oz. | large - $\frac{1}{8}$ oz. | large & heavy = $\frac{1}{4}$ oz. |
|---|---|---|
| (hot pink) | (blaze orange) | (glow-in-the-dark/chartreuse) |

Three different weights are utilized because some fish are picky about what their food feels like. Trout are like this. If they feel too much resistance in their food, they'll spit it out. The small ring is ideal for this although hatchery trout are often dumb enough that the $\frac{1}{8}$ oz. ring can be used. The large & heavy ring is for night fishing for catfish which is very popular. Catfish are not sensitive when it comes to resistance although the ones smaller than 3 pounds tend to be. When there is enough current or wind, a heavier ring like this $\frac{1}{4}$ oz. will do just fine.

The large $\frac{1}{8}$ oz. ring is the ideal all-purpose weight for most immobile bait fishing applications. Indeed, the other 2 are only for special circumstances. I'm sure that the Dept. of Transportation designated the color blaze orange for traffic cones for a reason. It is the most visible under almost all lighting conditions and that is why this all-purpose ring should be in blaze orange. These 3 weights are standard in the industry and recognizable by the public.

The color hot pink is popular among women. Trout fishing is popular among women. The small ring is good for trout. Yellow would look too much like the glow-in-the-dark/chartreuse. White is too plain and not very visible in some conditions.

Why the butterfly shape?

Actually, this was the first shape that I thought of until I found that a round flat shape was simpler. However, I recently discovered that when using braided fishing line, which is very limp, the ring would tangle if it would be bumped and spun while dangling in the "down" position. The braided line would not have enough memory stiffness to unravel itself when tension (a fish) would be applied. (The butterfly shape "grabs" the rod station better in the "up" position, it's more stable.)

In the butterfly shape, both segments of dangling line are separated from each other. Each segment occupies a butterfly wing and therefore never touch each other. Note: the bottom space diameter should not exceed the space height for good stability.

Definitions the "UP" position—when the ring is attached to the rod station.

the "DOWN" position—when the ring is dangling line segments waiting for a fish to bite.

DISCUSSION ABOUT THE ROD STATION

The driving concept behind the rod station is ONE SIZE FITS ALL. The rod station is meant to be stationed at arm's length away, preferably at the rod guide closest to the reel. This is possible except for 2 circumstances: when the big saltwater spinning rods are used, and when the small ring is used on a medium to large rod whose lower rod (single-footed) guides may be too large for the small ring to fit around.

In these cases, the rod station would have to be stationed higher up on the rod until a "compatible" rod guide is found. In my research with the big saltwater spinning rods, the rod station was always able to be compatible with the second to the largest rod guide, thereby being always at arm's reach. This is important for convenience.

LIMITING FACTORS

I did not want to use a ring that looks too big and awkward for its first introduction into the market. (Maximum space dimensions: 2") I did not want to make different rod station sizes for its first introduction into the market. I wanted a rod station that would wrap around a very big rod and also fit around a very small rod.

What I came up with is a rod station with dimensions as universal as practically possible. It can be used with all spinning rods in a practical manner (except for those tiny micro-lite rods which can be bent double by a minnow). For it to fit on the largest rod guide for every spinning rod, single-footed or double-footed, there would have to be different sizes of rod stations corresponding to different sizes of rings. Individually ideal as that may be, it would cause too much confusion for an introductory item and too high of a production cost. (At least at first.)

DISCUSSION ABOUT THE RING PROTOTYPES AND ROD STATION PROTOTYPE

For a ONE SIZE FITS ALL concept, the rod station needed to straddle a 1¾" double-footed rod guide (measured from front "ankle" to back "ankle") which is the maximum sized rod guide the rod station can accommodate.

The ⅛ oz. ring and the ¼ oz. ring sizes where decided from the dimensions of the rod station.

A near dilemma came when I realized the big rings have to be large enough to straddle the 1¾" double-footed rod guide yet be light enough to weigh only ⅛ oz. Once this was accomplished, making the ¼ oz. ring would be easy by making the ⅛ oz. ring wider (not thicker because wider has more surface area for visibility).

The rod station is made from ½" PVC 1120–1220 pipe. The VELCRO straps are from the "Glue-on tape for rough surfaces" package. Note how the entire width of the VELCRO strap contains the hook surface instead of the normal VELCRO which has bald edges. This is important. The fuzzy VELCRO patches on the lower region of the straps are nothing special however and you can see bald edges on these.

A logo is engraved in blaze orange on the rod station. The body is painted black but could also be painted gray.

The material used for the ring is smooth like PVC, but not tacky like aquarium tubing.

The glue used to stick fuzzy VELCRO on the rings comes from the same VELCRO package mentioned above, although it says on the package that it is not to be used on PVC pipe. It works better than Fishing Glue which has the same active ingredient as in Krazy Glue.

HOW IT WORKS

In the UP position, the ring is out of the way of the line being cast out. After the cast, the rod is set on a stand at a 45 degree angle or less. The closer the rod parallels the ground, as it is suspended on a stand, the more effective is the apparatus in doubling the angle's response time once it begins to move from a bite.

The ring is now removed from its rod station, ROTATED ONE-QUARTER TURN so each wing space straddles a line segment, and then pulled down to the ground so each wing tip now dangles a segment of the line. This is the DOWN position.

When a fish pulls, the front line segment is pulled up first due to less friction (if the rod is parallel—if the rod is at a 45 degree angle, both segments come up at the same time), swinging the ring up and forward; and then as the fish continues pulling, the ring travels backwards towards the rod station's rod guide. The angler then sets the hook as the ring is touching or nearly touching the rod guide. The angler can fight the fish as the ring flops around the rod guide unsecured because as long as the angler maintains constant tension on the line there is no chance of the ring tangling the line. If the angler so wishes, the ring can be secured during the fight by just reaching out with one hand and doing the opposite motion used to get it to the down position: ONE-QUARTER TURN done after it is lifted up from the line, and then pushed up to its VELCRO attachments on the rod station.

MISCELLANEOUS INFORMATION

1) The apparatus doubles the angler's response time if the rod parallels the ground, and increases it by 50% if the rod is at a 45 degree angle which is still quite substantial.

2) The rod station and rings cannot be used on non-spinning rods unless the rods have at least one rod guide standing far enough from the rod shaft so that the line won't rub against any part of the rod station.

3) The VELCRO adhesive glue should be replaced if PVC is ultimately used for the ring due to the warning by the VELCRO company.

ADDITIONAL INFORMATION REGARDING USE OF THE APPARATUS

1) In the "UP" position the cooperatively coupled ring is tucked away securely and does not touch the line so it does not interfere with casting.

2) In the "DOWN" position 2 sections of the line are extended from the rod. This up to DOUBLES the amount of time the fisherman can get to his rod once he sees it moving from a bite.

3) In the "DOWN" position, the use of 3 line guides anchors the rings from spinning due to line twist. However, it will tangle from excessive line twist.

8) Regarding Point #2: No fishing invention has ever made use of 2 sections of rod line. No modification by any fisherman have I ever heard or seen use 2 sections of rod line in my 24 years of fishing.

9) All this is a comparison with the usual signal used for bait fishing, that is the use of a plastic bobber dangling from 1 section of rod line. The amount of space from rod to ground limits the amount of dangling rod line (1 section) for reaction time.

10) I determined the weight of the rings by the size of the target fish and/or fishing line strength used by the angler. An angler using heavy strength line such as 15–20 lb. test is probably fishing for big fish. Big fish are not sensitive to care about pulling a ¼ oz. ring but small fish are. The large ring must not be too light because thick monofilament line has memory coils that will not hang down smoothly with a weight too light. As a general rule: small ring for small fish (or large sensitive fish such as big trout fished with light line), large & heavy ring for large fish fished with strong line, and the large (⅛ oz.) ring for most freshwater fishing (with bait). As a general rule: small ring=1/16 oz., large=⅛ oz., large & heavy=¼ oz. The ring, plastic or otherwise, must not have any sharp edges or notches which will hurt fishing line. The "fuzzy" VELCRO does not "catch" fishing line.

11) It is important that the fisherman wait until the ring has traveled all the way up or almost all the way up to the "UP" position before hitting the fish (setting the hook) to prevent "ROD-WRAPAROUND".

12) As long as the ring has not wrapped around the rod while setting the hook, the fisherman does not have to attach the ring to the rod VELCRO while fighting the fish. It will not tangle as it flops around harmlessly during the fight.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the united states is as follows:

1. A fishing rod strike indicator for increasing reaction time with the fishing reel in gear comprising:

a fishing rod;

a closed loop member depending from a line associated with the fishing rod; and coupling means for allowing the attachment of the closed loop member to the rod and further allowing the detachment of the closed loop member from the rod such that the closed loop member depends from the line thereby extending the line away from the fishing rod, the extended line enhancing a user's ability to detect bites from fish;

wherein the closed loop member is shaped in a generally elliptical configuration and folded along its center point to form a generally V-shaped configuration.

2. The fishing rod strike indicator for increasing reaction time with the fishing reel in gear as set forth in claim 1 wherein the coupling means includes a snap coupled to the closed loop member, the snap having a generally U-shaped configuration and being constructed from a resilient material, the snap being snappedly attached to the rod.

3. The fishing rod strike indicator for increasing reaction time with the fishing reel in gear as set forth in claim 2 wherein the resilient material is plastic.

4. The fishing rod strike indicator for increasing reaction time with the fishing reel in gear as set forth in claim 1 wherein a plurality of closed loop members are included having different weights.

5. A fishing rod strike indicator for increasing reaction time with the fishing reel in gear for use in association with a fishing rod including at least one rod guide, a fishing reel and fishing line, the apparatus comprising:

a fishing rod; and at least one hanger resting on a line associated with the rod thereby extending the line away from the fishing rod, the extended line enhancing a user's ability to detect bites from fish;

said hanger abutting the line at two spaced locations for providing stability during use of the rode;

wherein the hanger is shaped in a generally elliptical configuration with elliptical ends and folded along its center point to form a generally V-shaped configuration, the hanger having a folded region whereby the elliptic ends of the hanger engage the fishing line.

6. The fishing rod strike indicator for increasing reaction time with the fishing reel in gear as set forth in claim 5 wherein each hanger includes at least one snap coupled thereto, the snap having a generally U-shaped configuration and being constructed from a resilient material, the snap being snappedly attached to the rod.

7. The fishing rod strike indicator for increasing reaction time with the fishing reel in gear as set forth in claim 5 wherein a pair of the snaps are situated on an interior surface of the centerpoint of the hanger, whereby the hanger has a stored orientation with elliptical ends thereof extending above the rod opposite a line associated with the rod and an employed orientation with the centerpoint extending below the line of the rod opposite the rod.

8. A fishing rod strike indicator for increasing reaction time with the fishing reel in gear for use in association with a fishing rod including at least one rod guide, a fishing reel and fishing line, the apparatus comprising:

a fishing rod; and at least one hanger resting on a line associated with the rod thereby extending the line away from the fishing rod, the extended line enhancing a user's ability to detect bites from fish;

said hanger abutting the line at two spaced locations for providing stability during use of the rod;

wherein the hanger has a pair of elliptical ends with which the centerpoint forms an approximate 40 degree angle.

* * * * *